United States Patent
Melcher et al.

(10) Patent No.: US 9,183,589 B2
(45) Date of Patent: *Nov. 10, 2015

(54) SYSTEMS AND METHODS TO PROVIDE VISUAL BROWSING

(71) Applicant: eBay Inc., San Jose, CA (US)

(72) Inventors: Ryan Melcher, Ben Lomond, CA (US); Dane Howard, Los Gatos, CA (US)

(73) Assignee: eBay, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/617,714

(22) Filed: Feb. 9, 2015

(65) Prior Publication Data

US 2015/0154692 A1     Jun. 4, 2015

Related U.S. Application Data

(63) Continuation of application No. 14/159,323, filed on Jan. 20, 2014, now Pat. No. 8,954,421, which is a continuation of application No. 13/901,370, filed on May 23, 2013, now Pat. No. 8,635,210, which is a (Continued)

(51) Int. Cl.
*G06F 17/30* (2006.01)
*G06Q 30/06* (2012.01)
*G06F 3/0484* (2013.01)

(52) U.S. Cl.
CPC .......... *G06Q 30/0643* (2013.01); *G06F 3/0484* (2013.01); *G06F 3/04842* (2013.01);

(Continued)

(58) Field of Classification Search
CPC ............ G06F 17/30873; G06F 17/30994; G06F 17/30973

USPC ................... 707/722; 709/203; 715/204, 273; 345/419, 634, 649, 650, 689, 161, 163, 345/173

See application file for complete search history.

(56) References Cited

U.S. PATENT DOCUMENTS

| | | |
|---|---|---|
| 6,366,299 B1 | 4/2002 | Lanning et al. |
| 7,366,723 B2 | 4/2008 | Shaburov |

(Continued)

FOREIGN PATENT DOCUMENTS

| | | |
|---|---|---|
| AU | 2011101048 A4 | 9/2011 |
| AU | 2010218060 | 10/2012 |

(Continued)

OTHER PUBLICATIONS

"U.S. Appl. No. 12/712,163, 312 Amendment filed Feb. 27, 2012", 7 pgs.

(Continued)

*Primary Examiner* — Cheryl Lewis
(74) *Attorney, Agent, or Firm* — Schwegman Lundberg & Woessner, P.A.

(57) ABSTRACT

Systems and methods for multi-directional visual browsing on an electronic device are described. In example embodiments, a a primary item is positioned in a predetermined location on a visual display. Navigation direction constraints are determined. The navigation direction constraints provide guidance as to where related items that are related to the primary item, based on at least one attribute of the primary item and attributes of the related items, should be located in the visual display. The related items are positioned in proximity to the predetermined location of the primary item based on the determined navigation direction constraints.

20 Claims, 7 Drawing Sheets

Related U.S. Application Data continuation of application No. 13/354,875, filed on Jan. 20, 2012, now Pat. No. 8,452,759, which is a continuation of application No. 12/712,163, filed on Feb. 24, 2010, now Pat. No. 8,166,023.

(60) Provisional application No. 61/155,104, filed on Feb. 24, 2009.

(52) U.S. Cl.
CPC .... *G06F17/30477* (2013.01); *G06F 17/30873* (2013.01); *G06F 17/30876* (2013.01); *G06F 17/30973* (2013.01); *G06F 17/30991* (2013.01)

(56) References Cited

U.S. PATENT DOCUMENTS

| | | | |
|---|---|---|---|
| 7,555,496 | B1 | 6/2009 | Lantrip et al. |
| 7,774,326 | B2 | 8/2010 | Arrouye et al. |
| 8,166,023 | B2 | 4/2012 | Melcher et al. |
| 8,352,869 | B2 | 1/2013 | Melcher et al. |
| 8,452,759 | B2 | 5/2013 | Melcher |
| 8,635,210 | B2 | 1/2014 | Melcher et al. |
| 8,954,421 | B2 | 2/2015 | Melcher et al. |
| 2002/0026358 | A1 | 2/2002 | Miller et al. |
| 2005/0091118 | A1 | 4/2005 | Fano |
| 2006/0036577 | A1 | 2/2006 | Knighton et al. |
| 2006/0059440 | A1 | 3/2006 | Pry |
| 2006/0169772 | A1 | 8/2006 | Page et al. |
| 2006/0179039 | A1 | 8/2006 | Murarka et al. |
| 2007/0033177 | A1 | 2/2007 | Friedman |
| 2007/0192345 | A1 | 8/2007 | Finley et al. |
| 2007/0276801 | A1 | 11/2007 | Lawrence et al. |
| 2008/0004904 | A1 | 1/2008 | Tran |
| 2008/0126303 | A1 | 5/2008 | Park et al. |
| 2008/0244429 | A1 | 10/2008 | Stading |
| 2009/0102805 | A1 | 4/2009 | Meijer et al. |
| 2009/0187558 | A1 | 7/2009 | McDonald |
| 2010/0217760 | A1 | 8/2010 | Melcher |
| 2010/0218116 | A1 | 8/2010 | Melcher et al. |
| 2012/0113112 | A1 | 5/2012 | Melcher et al. |
| 2013/0262450 | A1 | 10/2013 | Melcher et al. |
| 2014/0137007 | A1 | 5/2014 | Melcher et al. |

FOREIGN PATENT DOCUMENTS

| | | |
|---|---|---|
| CN | 1353838 A | 6/2002 |
| CN | 1890661 A | 1/2007 |
| CN | 102334154 A | 1/2012 |
| KR | 20070092262 A | 9/2007 |
| KR | 101318006 B1 | 10/2013 |
| KR | 101368612 B1 | 2/2014 |
| RU | 2480846 C1 | 4/2013 |
| WO | WO-2010099246 A1 | 9/2010 |

OTHER PUBLICATIONS

"U.S. Appl. No. 12/712,163, Notice of Allowance mailed Feb. 22, 2012", 9 pgs.
"U.S. Appl. No. 12/712,163, Notice of Allowance mailed Dec. 5, 2011", 10 pgs.
"U.S. Appl. No. 12/712,163, PTO Response to 312 Amendment mailed Mar. 20, 2012", 2 pgs.
"U.S. Appl. No. 12/712,167, Advisory Action mailed Aug. 3, 2012", 2 pgs.
"U.S. Appl. No. 12/712,167. Final Office Action mailed May 3, 2012", 6 pgs.
"U.S. Appl. No. 12/712,167, Non Final Office Action mailed Jan. 19, 2012", 10 pgs.
"U.S. Appl. No. 12/712,167, Notice of Allowance mailed Sep. 10, 2012", 5 pgs.
"U.S. Appl. No. 12/712,167, Response filed Apr. 19, 2012 to Non Final Office Action mailed Jan. 19, 2012", 10 pgs.
"U.S. Appl. No. 12/712,167, Response filed Jul. 3, 2012 to Final Office Action mailed May 3, 2012", 8 pgs.
"U.S. Appl. No. 13/354,875, Notice of Allowance mailed Feb. 1, 2013", 10 pgs.
"U.S. Appl. No. 13/901,370, Notice of Allowance mailed Sep. 17, 2013", 13 pgs.
"U.S. Appl. No. 13/901,370, Preliminary Amendment filed Jun. 19, 2013", 6 pgs.
"U.S. Appl. No. 14/159,323, Non Final Office Action mailed Jun. 10, 2014", 10 pgs.
"U.S. Appl. No. 14/159,323, Notice of Allowance mailed Oct. 7, 2014", 10 pgs.
"U.S. Appl. No. 14/159,323, Preliminary Amendment filed Jan. 24, 2014", 7 pgs.
"U.S. Appl. No. 14/159,323, Response filed Sep. 9, 2014 to Non Final Office Action mailed Jun. 10, 2014", 8 pgs.
"Australian Application Serial No. 2010218060, First Examiner Report mailed Sep. 8, 2011", 2 pgs.
"Australian Application Serial No. 2010218060, Response to Examiners Report Filed May 31, 2012", 11 pgs.
"Chinese Application Serial No. 201080009090.0, Office Action mailed Apr. 9, 2014", with English translation of claims, 3 pgs.
"Chinese Application Serial No. 201080009090.0, Office Action mailed Apr. 15, 2015", with English translation of claims, 13 pgs.
"Chinese Application Serial No. 201080009090.0, Office Action mailed Sep. 4, 2013", with English translation of claims, 9 pgs.
"Chinese Application Serial No. 201080009090.0, Office Action mailed Oct. 16, 2014", with English translation of claims, 19 pgs.
"Chinese Application Serial No. 201080009090.0, Response filed Jan. 20, 2014 to Office Action mailed Sep. 4, 2013", with English translation of claims, 13 pgs.
"Chinese Application Serial No. 201080009090.0, Response filed Feb. 27, 2015 to Office Action mailed Oct. 16, 2014", with English translation of claims, 17 pgs.
"Chinese Application Serial No. 201080009090.0, Response filed Jun. 24, 2014", with English translation of claims, 14 pgs.
"European Application Serial No. 10746800.1, Examination Notification Art. 94(3) mailed Jan. 6, 2014", 6 pgs.
"European Application Serial No. 10746800.1, Extended European Search Report mailed Feb. 7, 2013", 7 pgs.
"European Application Serial No. 10746800.1, Office Action Response filed Feb. 16, 2012", 13 pgs.
"European Application Serial No. 10746800.1, Response filed May 14, 2014 to Examination Notification Art. 94(3) mailed Jan. 6, 2014", 18 pgs.
"European Application Serial No. 10746800.1, Response filed Aug. 22, 2013", 25 pgs.
"International Application Serial No. PCT/US2010/025291, International Preliminary Report on Patentability mailed Sep. 9, 2011", 8 pgs.
"International Application Serial No. PCT/US2010/025291, Search Report mailed Apr. 14, 2010", 6 pgs.
"International Application Serial No. PCT/US2010/025291, Written Opinion mailed Apr. 14, 2010", 9 pgs.
"Korean Application Serial No. 2011-7022452, Notice of Allowance mailed Aug. 28, 2013", with English translation, 3 pgs.
"Korean Application Serial No. 2011-7022452, Office Action mailed Feb. 25, 2013", with English translation of claims, 6 pgs.
"Korean Application Serial No. 2011-7022452, Response filed Jun. 25, 2013", with English translation of claims, 52 pgs.
"Korean Application Serial No. 2013-7016567, Notice of Allowance mailed Feb. 12, 2014", with English translation, 3 pgs.
"Russian Application Serial No. 2011135879, Office Action mailed May 17, 2012", with English translation of claims, 7 pgs.
"Russian Application Serial No. 2011135879, Response filed Aug. 6, 2012 to Office Action mailed May 17, 2012", 9 pgs.
Dorot, Vyacheslav, et al., "Explanatory Dictionary on Modern Computer Lexicon", the 3rd edition, BHV-Petersburg, St. Petersburg, (2004), 498-499.

SYSTEMS AND METHODS TO PROVIDE VISUAL BROWSING

RELATED APPLICATIONS

The present application is a continuation of U.S. patent application Ser. No. 14/159,323, filed Jan. 20, 2014, now U.S. Pat. No. 8,954,421, which is a continuation of U.S. patent application Ser. No. 13/901,370, filed May 23, 2013, now U.S. Pat. No. 8,635,210, which is a continuation of U.S. patent application Ser. No. 13/354,875, filed Jan. 20, 2012, now U.S. Pat. No. 8,452,759, which is a continuation of U.S. patent application Ser. No. 12/712,163, filed Feb. 24, 2010, now U.S. Pat. No. 8,166,023, which claims the benefit of priority under 35 U.S.C. §119(e) to U.S. Provisional Application No. 61/155,104, filed Feb. 24, 2009. The content of the aforementioned applications are incorporated herein by reference in their entirety.

FIELD

The present disclosure relates generally to information display, and in a specific example embodiment, to multi-directional visual browsing on an electronic device.

BACKGROUND

The ubiquitous presence of networked computers and mobile devices, and the growing use of databases, web logs, and email have resulted in the accumulation of vast quantities of information. Many users now have access to this information via search engines and a bewildering array of web sites. Processing this information in a manner that is user-friendly and efficient creates a number of challenges and complexities.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based search and/or publication environment, the embodiments are given merely for clarity in disclosure. Thus, any type of electronic search system and method, including various system architectures, may employ various embodiments of the multi-dimensional visual browsing system and method described herein and is considered as being within a scope of example embodiments. Each of a variety of example embodiments is discussed in detail, below.

Example embodiments described herein provide systems and methods for allowing multi-directional visual browsing on an electronic device. According to an example embodiment, a primary result and a peripheral result associated with a user of a client device are determined. The primary result may be a list of one or more items or categories that are a result of a search or review of an account associated with the user. The peripheral result may be a list of one or more items or categories that are related to the primary results. For example, the peripheral result may comprise accessories, upgrades, similar items, or competitor items of the primary result.

A display layout based on attributes associated with the primary result and the peripheral result is generated. The display layout may position the primary result in a predetermined location (e.g., at a center of the display layout). The peripheral results may then be positioned around the primary result (e.g., in two-dimension or three-dimension). The display layout is then formatted into rendering and display instructions, which will cause a client device to render the display layout. The rendering and display instructions are transmitted to the client device.

Figure 1:
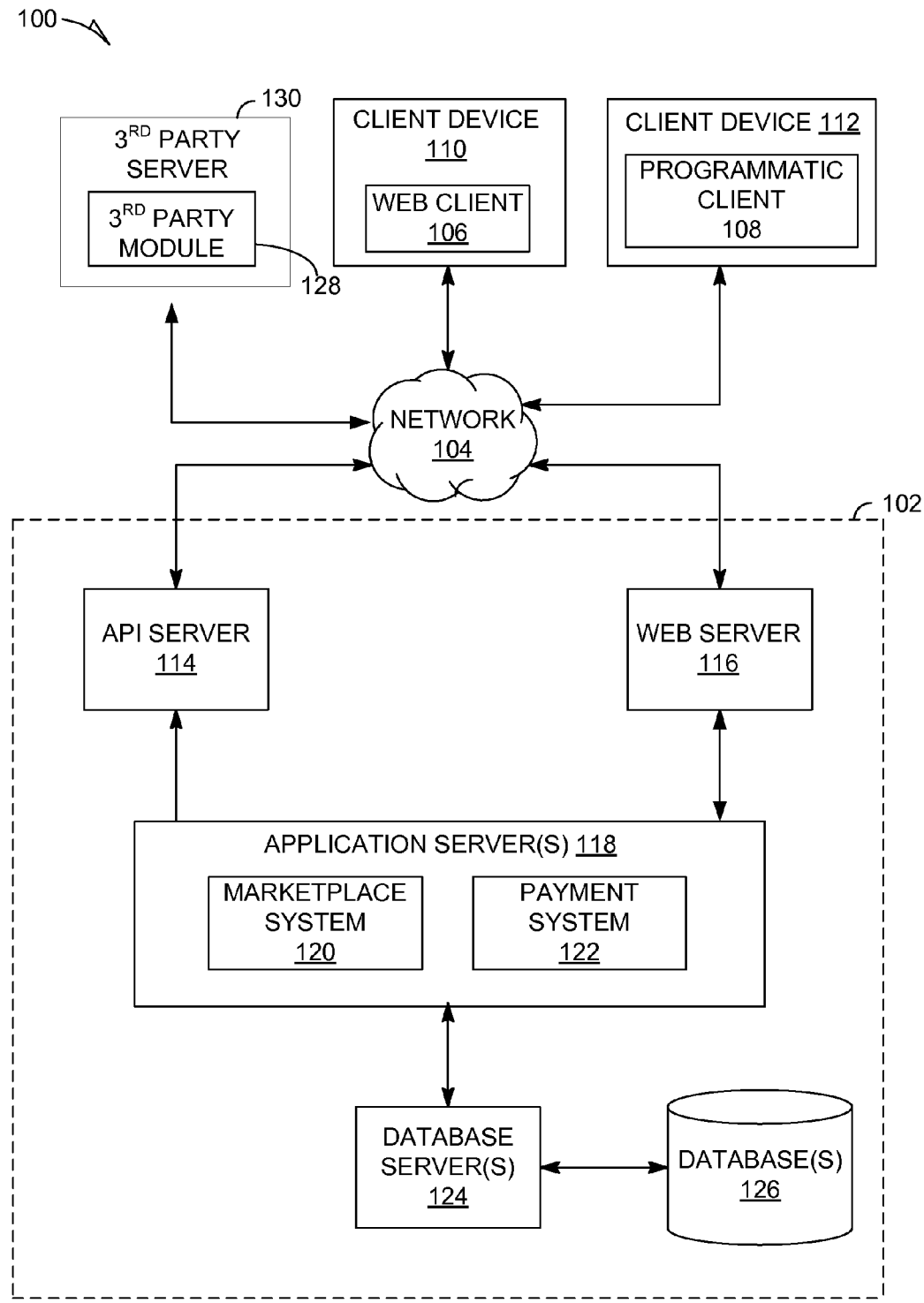
FIG. 1 is a block diagram illustrating an example embodiment of a network architecture of a system used to allow multi-directional visual browsing.

With reference to FIG. 1, an example embodiment of a high-level client-server-based network architecture 100 to allow multi-directional visual browsing is shown. A networked system 102, in an example form of a network-server-side functionality, is coupled via a network 104 (e.g., the Internet or Wide Area Network (WAN)) to one or more clients. FIG. 1 illustrates, for example, a web client 106 operating via a browser (e.g., such as the Internet Explorer® browser developed by Microsoft® Corporation of Redmond, Wash. State) and a programmatic client 108 executing on, respectively, client devices 110 and 112. The client devices 110 and 112 may include, for example, a mobile phone, a personal digital assistant (PDA), a gaming unit, a portable computing unit, or any other device capable of being communicatively coupled to the network 104.

The network 104 over which the networked system 102 and the client devices 110 and 112 interact may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

In some embodiments, the client device 110 or 112 may capture and transmit an image of an item of interest to the networked system 102. The image may be captured by a camera built into the client device 110 or 112 or by a digital camera, which is configurable to download its stored images to the client device 110 or 112. In some cases, the image may be a representation of an item of interest (e.g., barcode for the item). Alternatively, the user may locate the image through, for example, the Internet or other image repositories (e.g., using the browser). Additionally, the client device 110 may capture a verbal description of the item of interest. Images (both captured and obtained from other sources) and verbal descriptions are herein collectively referred to as image data.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage databases or repositories 126.

The databases 126 includes a collection of data comprising item images, transaction data, and item attribute information. The item images may be images used in an item listing to show a picture of the item. The item images may also be used for comparison with the image data received from the client device 110 or 112. The transaction data may include information regarding transactions conducted on the networked system 102. The transactional data may include, by way of example, pricing information for an item during a time period. The item attribute information may include information associate with an item including, for example, an image, title, subtitle, category, sub-category, related item listings, average price, quantities of the item currently available, and any other data that may describe and distinguish the item from other items in the database 126 or other items offered using the networked system 102.

The publication system 120 provides a number of publication and marketplace functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party website may, for example, provide one or more promotional, marketplace, or payment functions that are supported by the relevant applications of the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
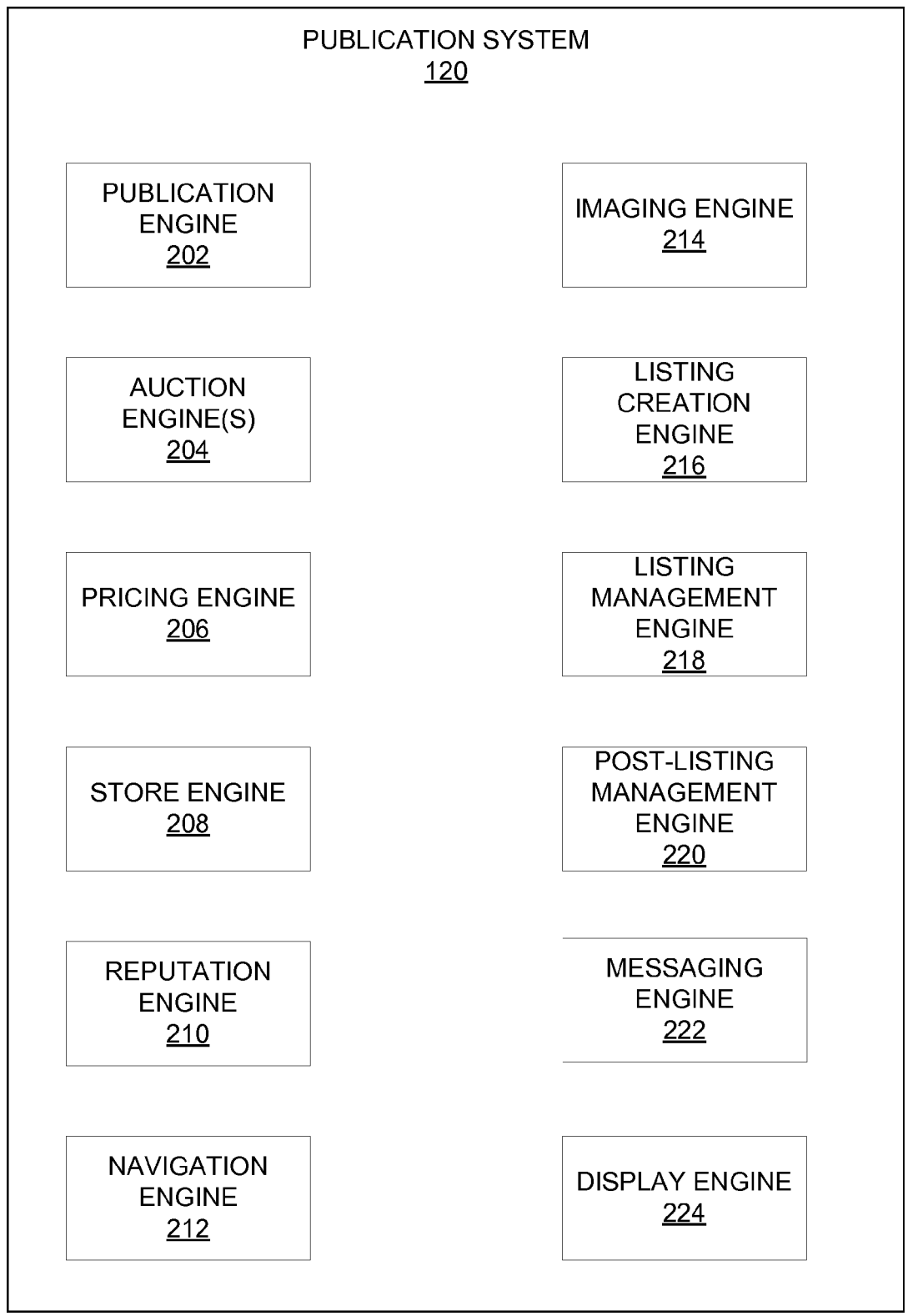
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

The networked system 102 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed-price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the networked system 102 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the networked system 102 over time. Other potential trading partners may then reference the reputation for purposes of assessing credibility and trustworthiness.

Navigation of the network-based marketplace may be facilitated by a navigation engine 212. For example, a search module of the navigation engine 212 enables keyword searches of item listings published via the publication system 120. In a further example, a browser module of the navigation engine 212 allows users to browse various category, catalogue, or inventory data structures according to which listings may be classified within the publication system 120. Furthermore, the navigation engine 212 in conjunction with the display engine 224 provides data and instructions to allow multi-directional visual browsing on the client device (e.g., client device 110). Various other navigation applications within the navigation engine 212 may be provided to supplement the searching and browsing applications. The navigation engine 212 is discussed in more detail in connection with FIG. 3.

In order to make listings available via the networked system 102 as visually informing and attractive as possible, the publication system 120 may include an imaging engine 214 that enables users to upload images for inclusion within listings and to incorporate images within viewed listings. The imaging engine 214 also receives image data from a user and utilizes the image data to identify an item depicted or described by the image data.

A listing creation engine 216 allows sellers to conveniently author listings pertaining to goods or services that sellers wish to transact via the networked system 102, while a listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

A display engine 224 manages data which allows multi-directional visual browsing on a client device. In example embodiments, the display engine 224 obtains and formats data for visual browsing and transmits the formatted data to the requesting client device. The display engine 224 will be discussed in more detail in connection with FIG. 4.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein. While the publication system 120 is described in a marketplace embodiment, it should be noted that the publication system 120 may be used in any search environment.

Figure 3:
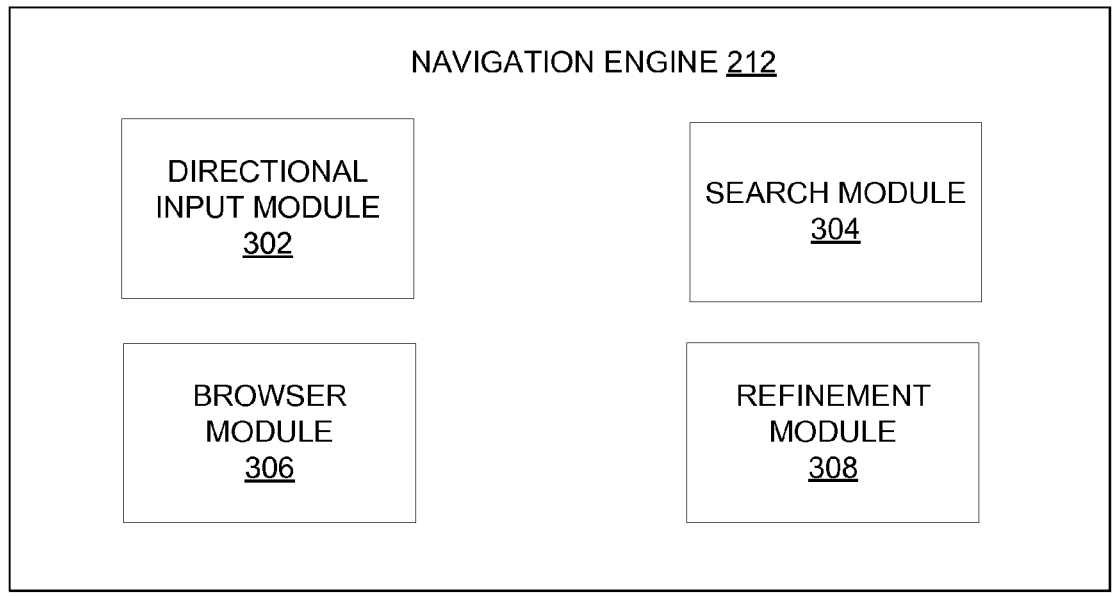
FIG. 3 is a block diagram illustrating an example embodiment of a navigation engine.

Application of Embodiments of the Multi-Directional Visual Browsing Platform into the Example Network Architecture Referring now to FIG. 3, an example diagram of the navigation engine 212 is shown. In one embodiment, the navigation engine 212 facilitates navigation of a network-based marketplace. In example embodiment, the navigation engine 212 comprises a directional input module 302, a search module 304, a browser module 306, and a refinement module 308. Alternative embodiments may comprise further components or modules not directly related to example embodiments of the multi-directional visual browsing system, and thus are not shown or discussed. Furthermore, some of the components of the navigation engine 212 may be located elsewhere (e.g., in the display engine 224) or combined into a single module.

The directional input module 302 receives navigational inputs from the client device and triggers operations of the search module 304 or the refinement module 308 in response. The navigational inputs may comprise, for example, a scrolling action in a particular direction (e.g., up, down, left, right, or diagonally) on the client device. The navigational inputs may also include a tap selection (e.g., dual touch), whereby the user of the client device selects a representation of an item or category, or the user drills down into a lower level of a multi-level display.

The search module 304 performs a search for a primary result. The primary result is a main result that is a focus of the user's search. For example, if the user is searching for a Sony® Playstation 2 console, the primary result may be a Sony® Playstation 2 category (e.g., Sony® Playstation 2 consoles). In some embodiments, the search module 304 enables keyword searches (e.g., "Sony® Playstation 2") of listings published via the publication system 120. Additionally, the user's account may indicate one or more favorite merchants or past purchased items. In one embodiment, the search module 304 may determine items associated with the one or more favorite merchants and uses the results as the primary results. In another embodiment, the search module 304 may determine items similar to previously purchased items (e.g., accessories or upgraded versions) and use the results as the primary results.

The browser module 306 allows users to browse various category, catalogue, or inventory data structures according to which item listings may be classified within the publication system 120. In this example, browser module 306 allows users to browse or navigate through various categories of the product infrastructure to arrive at a product category or item (e.g., electronics→entertainment→gaming→game consoles→Sony® Playstation 2). In some embodiments, the functions of the browser module may be incorporated into the search module 304.

In other embodiments, image data (e.g., an image captured by a camera or a verbal description of an item) received from the client device may be used to search for similar items as that depicted by the image data. A component of the networked system 102 (e.g., the search module 404 or a module of the imaging engine 214) compares the image data to a catalog of items. In one embodiment, the catalog may comprise item listings. The catalog may be organized as a matrix of data including a plurality of attributes associated with each item. For example, each item in the catalog may comprise an image, title, subtitle, category, sub-category, related item listings, average price, quantities of the item currently available, and any other data that may describe and distinguish the item from other items in the catalog. In one embodiment, the catalog may be stored in the database 126.

The refinement module 308 performs analysis to determine peripheral results and a next set of results (e.g., both primary and peripheral) for presentation in a multi-direction visual browser. In example embodiments, the refinement module 308 receives the primary result from the search module 304 and determines attribute information (e.g., associated categories, brand, model number) associated with the primary result. Using the attribute information, related items (e.g., having similar attributes) are determined. For example, if the primary result is Sony® Playstation 2, then the related items may include accessories for the Sony® Playstation 2 (e.g., game controllers, games), other versions of the Sony® Playstation 2 (e.g., Sony® Playstation 3), or competitor brands (e.g., Nintendo® Wii). These related items comprise the peripheral result.

When a navigation input is received by the directional input module 302, the refinement module 308 will refine the results. Thus, a directional input in a direction towards games for the Sony® Playstation 2 will change the primary result to games for the Sony® Playstation 2 and peripheral results may include the Sony® Playstation 2 consoles, games for other brands, or individual game titles.

Figure 4:
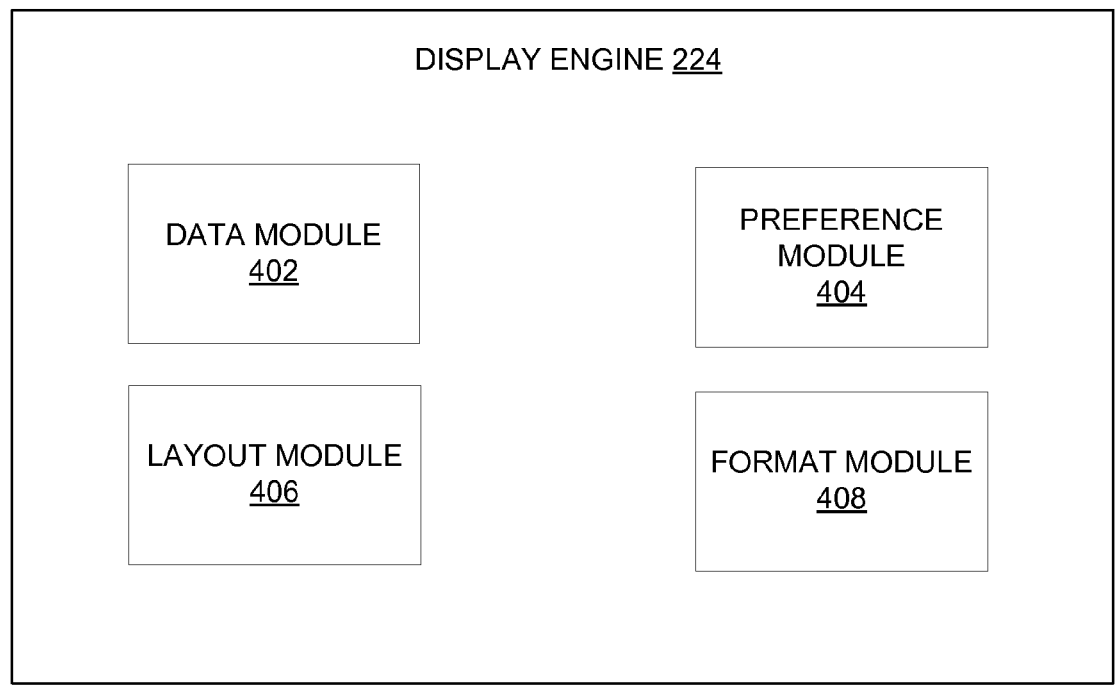
FIG. 4 is a block diagram illustrating an example embodiment of a display engine.

Referring now to FIG. 4, an example diagram of the display engine 224 is shown. The display engine 224, in conjunction with the navigation engine 212, provides mechanisms for enabling a client device to provide multi-direction visual browsing. The display engine 224 determines proper placement of components on a multi-directional visual browser and generates instructions to the client device to enable the rendering of the multi-direction visual browser at the client device. In example embodiments, the display engine 224 comprises a data module 402, a preference module 404, a layout module 406, and a format module 408. Alternative embodiments may comprise further components or modules not directly related to example embodiments of the multi-directional visual browsing system, and thus are not shown or discussed. Furthermore, some of the components of the display engine 224 may be located elsewhere (e.g., in the navigation engine 212) or combined into a single module.

The data module 402 receives and accesses data used to provide multi-directional visual browsing. In example embodiments, the data module 402 receives an initial request from the client device for multi-directional visual browsing. The data module 402 may access various databases (e.g., databases 126) to determine attributes of various items to be displayed in a multi-directional visual display. The data module 402 also obtains images of the associate items for display.

The preference module 404 determines preferences associated with the user or client device that is requesting multi-directional visual browsing. In one embodiment, a pattern of usage is tracked and used by the preference module 404 to determine preferences. The preferences may include display preferences (e.g., size of images or speed of navigation on the device) or result preferences (e.g., previously purchased item may be a primary result used to determine peripheral results as will be discussed further below).

The layout module 406 determines a display layout including both the primary and peripheral results. In one embodiment, the primary result is positioned centered on the display layout. In other embodiments, the primary result may be positioned in other locations of the display layout (e.g., to the right or left of center or in a corner of the display layout). Continuing with the Sony® Playstation 2 console example, a Sony® Playstation 2 console category may be positioned in a predetermined location (e.g., center) of the layout. The peripheral results are then displayed surrounding the primary result based on attributes associated with the peripheral results. For example, game controllers and games (e.g., accessories) may be positioned to the left and right of the console, respectively. Individual models of consoles available via the network-based marketplace may be positioned below the console category in one embodiment. In an alternative embodiment, the individual models of consoles may be positioned in a drill down from the console category (e.g., the primary result) or the individual models may be positioned in the center of the display layout. Other versions of the Sony® Playstation 2 (e.g., Sony® Playstation 3) may be located diagonally up from the centered primary result. In one example, competitor products (e.g, Nintendo® Wii) may be positioned directly above the centered primary result. While one example of a display layout is described herein, it is understood that alternative embodiments may utilize other layout formats and positions for peripheral results (e.g., related items).

In some embodiments, a navigation control display may be provided over the multi-directional visual browser to illustrate possible directions for multi-directional visual browsing. For example, graphical arrows may be drawn to indicate possible browsing/navigation directions. This may be useful when, for example, one direction of browsing is not available.

The format module 408 formats the display layout for transmission to the client device. In example embodiments, the format module 408 generates rendering and display instructions comprising the display layout. The rendering and display instructions enables a multi-direction visual browser to be rendered at the client device. In some embodiments, the format module 408 may access (or work with the preference module 404 to access) user preferences in order to customize the display layout to the user. In one embodiment, the format module 408 transmits the rendering and display instructions to the client device.

It should be noted that some of the modules of the display engine 224 may be located at the client device. For example, a version of the layout module 406 and the format module 408 may be located at the client device. Thus, the client device may receive data from a search result, determine a display layout for the data, and format the display layout for display.

Figure 5:
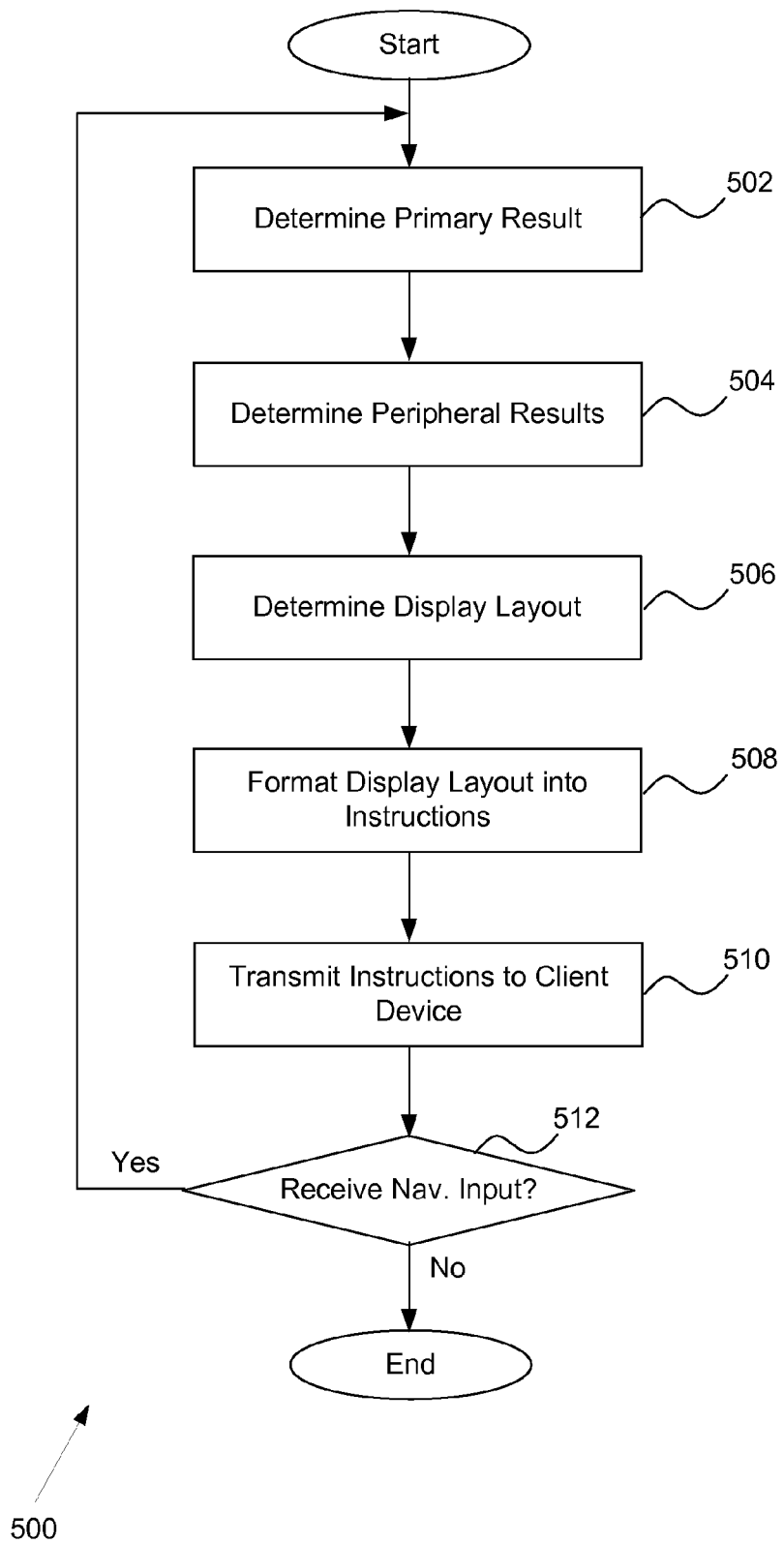
FIG. 5 is a flowchart illustrating a method for allowing multi-directional browsing.

FIG. 5 is a flowchart illustrating a method 500 for allowing multi-directional browsing. At operation 502, a primary result is determined. In example embodiments, the search module 404 performs a search for a primary result. The primary result may be a main result that is a focus of the user's search. In some embodiments, the primary result may be a result of a keyword search, an image data search, or traversal of the product infrastructure. In other embodiments, the primary result may be based on one or more lists associated with an account of a user at the client device (e.g., "watching" list, favorite seller list, past purchased items list).

At operation 504, a peripheral result is determined. The peripheral results comprise items or categories that are related to the primary result. Operation 504 will be discussed in more detail in connection with FIG. 6.

A display layout is determined at operation 506. The display layout comprises a guide for displaying the primary and peripheral results at the client device. Operation 506 will be discussed in further detail in FIG. 7.

At operation 508, the display layout is formatted into rendering and display instructions. In example embodiments, the format module 408 generates the rendering and display instruction using the display layout received from the layout module 406. The rendering and display instructions enables generation of a multi-directional visual browser at the client device. The rendering and display instruction may also include navigation control instructions for rendering and displaying navigation controls. For example, the navigation control display may be a graphical overlay, highlighted buttons on the peripheral of a display, or controls integrated into the display. Once generated, the rendering and display instructions are transmitted to the client device at operation 510.

Subsequently, at operation 512, a determination is made as to whether a navigation input is received from the client device. A navigation input is a result of a user physically indicating on the multi-directional visual browser a navigation input. In an example embodiment, the navigational input, on, for example, a touch screen, may include a swipe (e.g., up, down, left, right, or diagonally), press and hold, dual touch, multi-touch, pinch, or other inputs. In embodiments where the navigational input is a tap of dual touch selection, a result of the tap selection may be a drill down on the selected representation. For example, if the selection is of a category of goods (e.g., Sony® Playstation 2), the drill down may result in individual items within the category (e.g., Sonya Playstation 2 consoles) being offered for auction or sale.

In yet another embodiment, the navigational input may be received from a joystick, a keyboard, a mouse, an eye movement detection camera system, gesture input, or other inputs. In further embodiments, tilting of the client device may accelerate scrolling along a tilted direction. If a navigation input is received, then the method returns to operation 502 where a new primary result is determined. The new primary result is based on the item or category selected (or in the direction of the navigation input) based on the navigation input.

Figure 6:
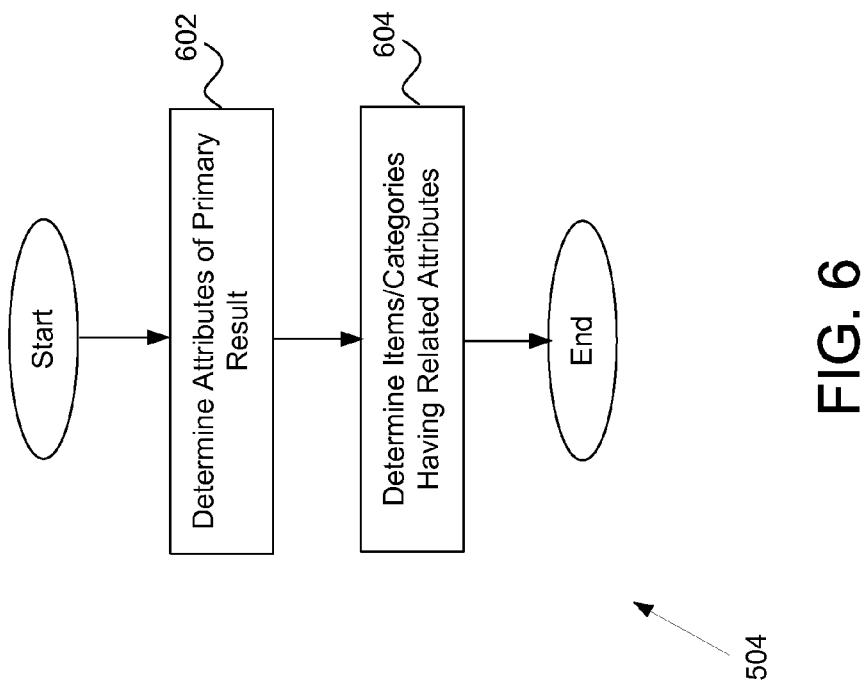
FIG. 6 is a flowchart illustrating a method for determining peripheral results.

FIG. 6 is a flowchart illustrating a method for determining a peripheral result (e.g., operation 504). At operation 602, attributes for the primary result are determined. In example embodiments, the refinement module 308 receives the primary result and determines attributes (e.g., associated categories, brand, model number, average price, or any other information that may distinguish an item or category form other items or category) associated with the primary result.

Using the attribute information for the primary result, related items or categories of items (e.g., having similar attributes) are determined at operation 604. These related items or categories comprise the peripheral result.

Figure 7:
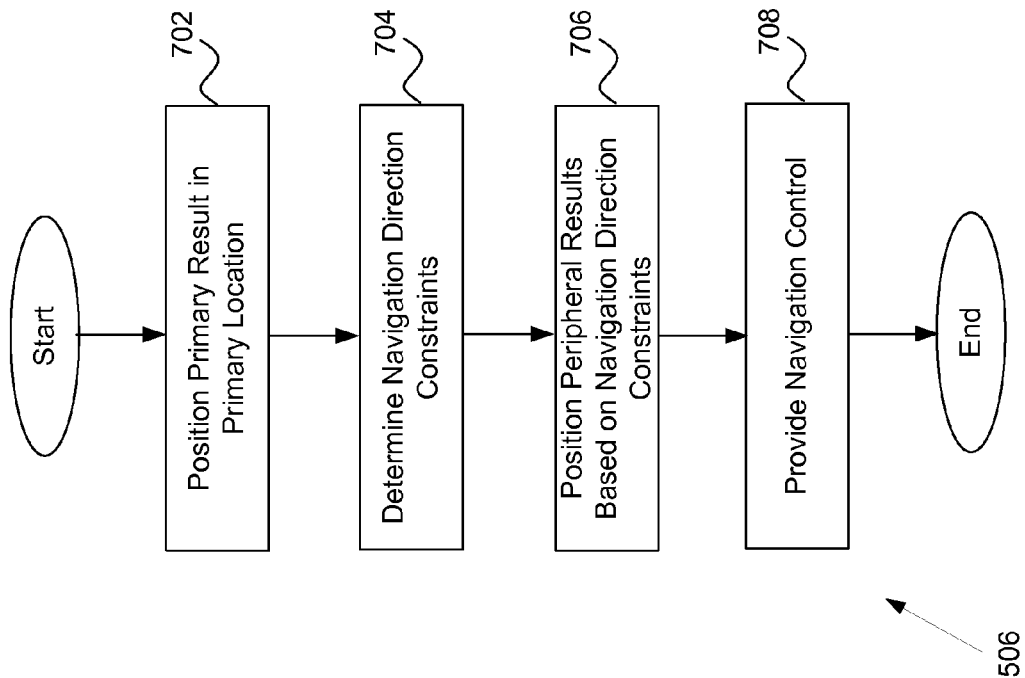
FIG. 7 is a flowchart illustrating a method for generating a display layout.

FIG. 7 is a flowchart illustrating a method for generating a display layout (e.g., operation 506). In example embodiments, the display layout is generated by the layout module 306. The display layout may be performed at the publication system 120 or at the client device. At operation 702, the primary result is positioned at a predetermined location. In one embodiment, the predetermined location is at a center of the display layout. Alternative embodiments, may locate the predetermined location anywhere on the display layout. The item(s), category, or categories of the primary result will be visually represented at the predetermined location once rendered at the client device.

Navigation direction constraints are determined at operation 704. The navigation direction constraints provide guidance as to where items/categories should be located. In a two-dimensional embodiment, the navigation direction constraints may be provided in any number of directions in a radial form from a central position. In yet another embodiment, navigation directions may be enabled for a three-dimensional plane. In this embodiment, a category may be drilled down into so as to arrive at a second level or plane populated with a plurality of items within the category. Further levels or planes may be provided. In yet another embodiment, the navigational direction may include a 3-D plane having topographical features based on attributes of the device.

For example, the navigation direction constraint may indicated that accessories should be positioned to the left of the predetermined location, while another navigation direction constraint may indicate that related versions of the primary result (e.g., upgraded version) should be positioned diagonally to a top right of the predetermined location and similar competitor products should be positioned above the predetermined location.

The navigation direction constraints may be generated by the layout module 406. Alternatively, generic navigation direction constraints may be stored in a database and the layout module 406 accesses the stored navigation direction constraints and applies the primary result attributes to determine the proper navigation direction constraints to be used in a current display layout.

Once the navigation direction constraints are determined, the peripheral results are positioned on the display layout based on the navigation direction constraints at operation 706. For example, a Sony® Playstation 2 console category (e.g., primary result) may be positioned in a center or predetermined location of the display layout. Game controllers and games (e.g., accessories) may be positioned to the left and right of the console, respectively. Individual models of consoles available via the network-based marketplace or publication system may be positioned below the console category in one embodiment. In an alternative embodiment, the individual models of consoles may be positioned in a drill down from the console category (e.g., the primary result) or the individual models may be positioned in the center of the layout. Other versions of the Sony® Playstation 2 (e.g., Sony® Playstation 3) may be located diagonally up from the centered primary result. In the example, competitor brands (e.g, Nintendo® Wii) may be positioned directly above the centered primary result.

In operation 708, a navigation control display is provided. In some embodiments, the navigation control display may be provided over the display layout on the multi-directional visual browser to illustrate possible directions for multi-directional visual browsing. This may be useful when, for example, one direction of browsing is not available. It should be noted that operation 708 is optional.

Figure 8:
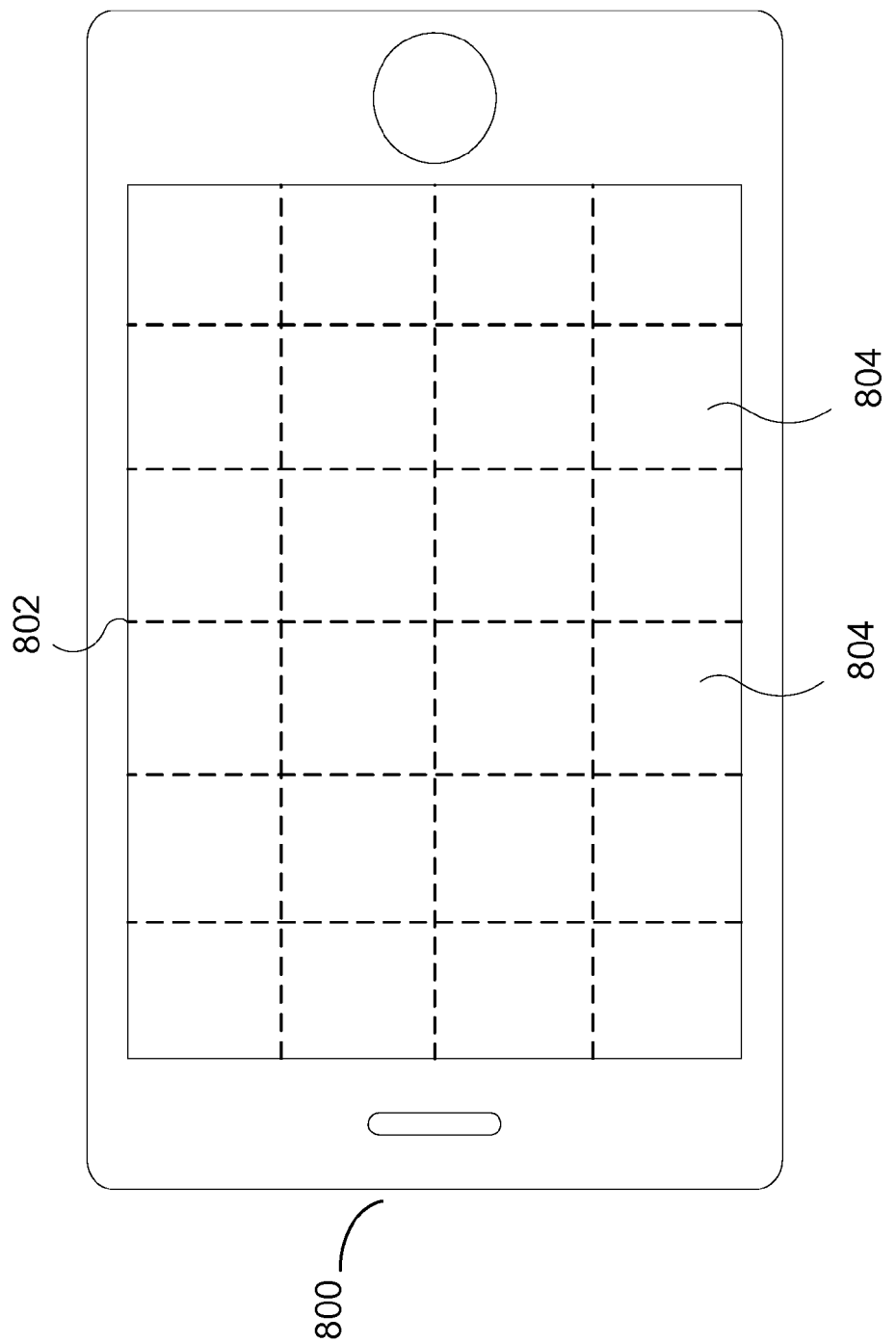
FIG. 8 is an example of an electronic device capable of illustrating a multi-directional visual browser according to an example embodiment.

FIG. 8 is an example of an electronic device or client device 800 illustrating a multi-directional visual browser 802 according to an example embodiment. As shown, the multi-directional visual browser 802 is illustrated in a grid format comprising a plurality of image blocks 804. Each image block 804 visually represents an item or category. In example embodiments, an image of the item or category is included in each image block 804. Information regarding the item or category may also be provided on the image block 804.

While the embodiment of FIG. 8 is arranged in the grid format, the arrangement may be a circular formation, a triangular formation, or any other shape formation. The multi-dimensional visual browser may, in alternative embodiments, be topographically populated, populated by layers of attributes, or be three-dimensional. By example, another embodiment may arrange the items according to an importance or hierarchy provided to the items by user preferences or popularity.

A primary result is display at a predetermined location. The predetermined location may comprise one or more image blocks 804 of the multi-directional visual browser. In one embodiment, the predetermined location is located at the center of the multi-directional visual browser. Alternatively, the predetermined location may be a corner, top, bottom, right, or left position of the multi-directional visual browser.

While not shown in FIG. 8, navigational controls may be displayed. In various embodiments, the navigation controls may be a graphical overlay over the image blocks 804 (e.g., at edges of the multi-directional visual browser 802), highlighted buttons on the periphery of a display, or controls integrated into the display.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 9:
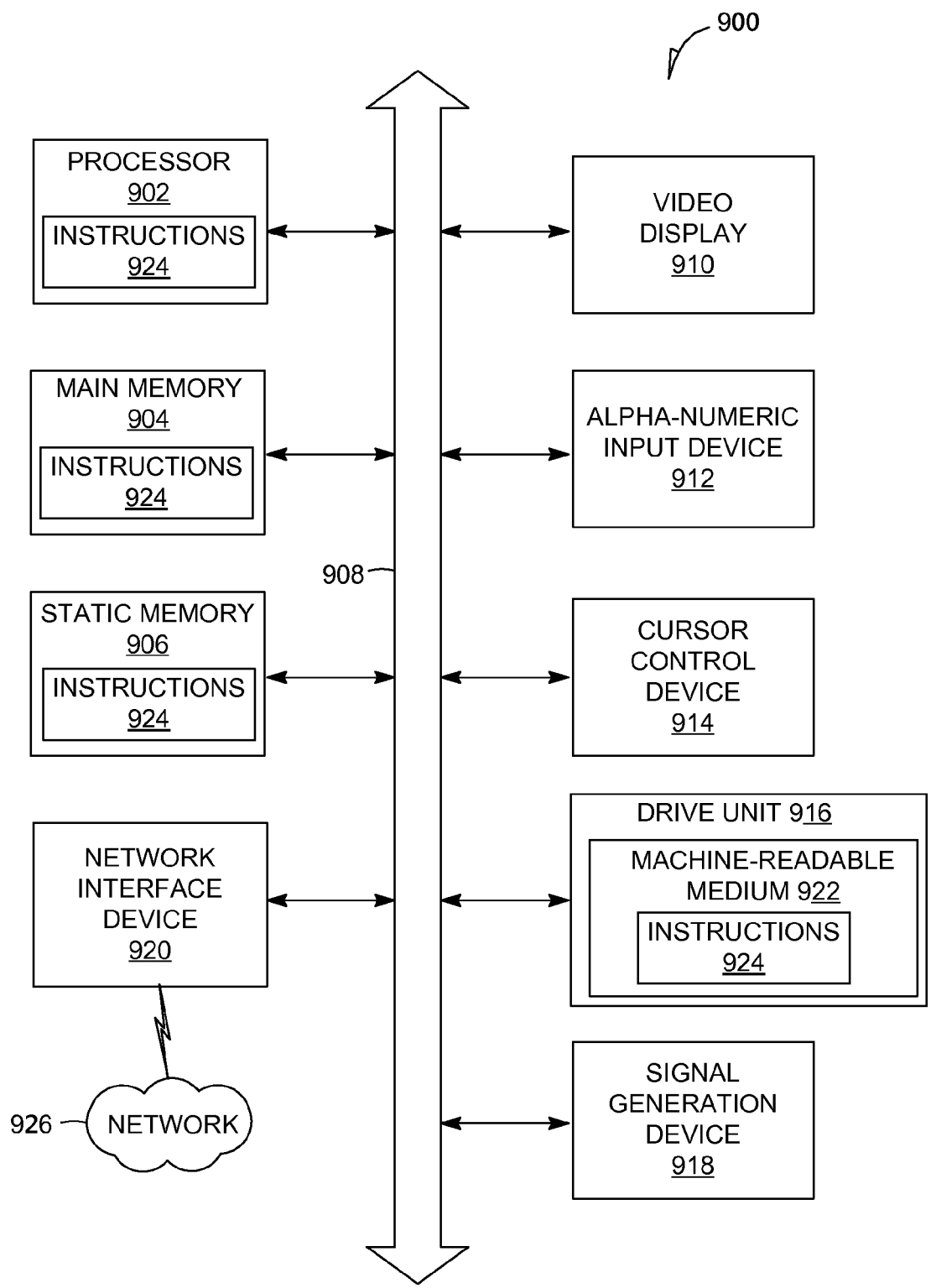
FIG. 9 is a simplified block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
a layout module comprising at least one hardware process to cause presentation of a visual display on a device, the layout module to cause the presentation by performing operations comprising:
positioning a primary item in a predetermined location on the visual display;
determining, by a hardware processor, navigation direction constraints, the navigation direction constraints providing guidance as to where related items that are related to the primary item, based on at least one attribute of the primary item and attributes of the related items, are to be located in the visual display; and
positioning the related items in proximity to the predetermined location of the primary item based on the determined navigation direction constraints.

2. The system of claim 1, wherein:
the related items comprise an accessory related to the primary item; and
the navigation direction constraint indicates that the accessory related to the primary item is positioned in a particular direction from the predetermined location.

3. The system of claim 1, wherein:
the related items comprise a related version of the primary item; and
the navigation direction constraint indicates that the related version of the primary item is positioned in a particular direction from the predetermined location.

4. The system of claim 1, wherein:
the related items comprise a similar competitor product; and
the navigation direction constraint indicates that the similar competitor product is positioned in a particular direction from the predetermined location.

5. The system of claim 1, wherein:
the primary item comprises a category and the related items comprise individual products within the category; and
the navigation direction constraint indicates that the individual products are positioned in a drill down level below a main level having the predetermined location.

6. The system of claim 1, wherein the determining the navigation direction constraints comprises:
accessing a database that stores the navigation direction constraints; and
retrieving the navigation direction constraints.

7. The system of claim 1, wherein the layout module is further to cause display of a navigation control on the visual display, the navigation control indicating available directions for multi-direction visual browsing.

8. The system of claim 1, further comprising:
a search module to identify the primary item; and
a refinement module to determine the at least one attribute of the primary item, and using the at least one attribute, determine the related items based on the related items having attributes related to the at least one attribute of the primary item.

9. The system of claim 1, further comprising a directional input module to receive a navigational input, the navigational input causing the related items to spatially shift on the visual display.

10. A system comprising:
causing presentation of a visual display on a device, the causing comprising:
positioning a primary item in a predetermined location on the visual display;
determining, by a hardware processor, navigation direction constraints, the navigation direction constraints providing guidance as to where related items that are related to the primary item, based on at least one attribute of the primary item and attributes of the related items, are to be located in the visual display; and
positioning the related items in proximity to the predetermined location of the primary item based on the determined navigation direction constraints.

11. The method of claim 10, wherein:
the related items comprise an accessory related to the primary item; and
the navigation direction constraint indicates that the accessory related to the primary item is positioned in a particular direction from the predetermined location.

12. The method of claim 10, wherein:
the related items comprise a related version of the primary item; and
the navigation direction constraint indicates that the related version of the primary item is positioned in a particular direction from the predetermined location.

13. The method of claim 10, wherein:
the related items comprise a similar competitor product; and
the navigation direction constraint indicates that the similar competitor product is positioned in a particular direction from the predetermined location.

14. The method of claim 10, wherein:
the primary item comprises a category and the related items comprise individual products within the category; and
the navigation direction constraint indicates that the individual products are positioned in a drill down level below a main level having the predetermined location.

15. The method of claim 10, wherein the determining the navigation direction constraints comprises:
accessing a database that stores the navigation direction constraints; and
retrieving the navigation direction constraints.

16. The method of claim 10, further comprising causing display of a navigation control on the visual display, the navigation control indicating available directions for multi-direction visual browsing.

17. The method of claim 10, further comprising:
identifying the primary item;
determining the at least one attribute of the primary item; and
using the at least one attribute, determining the related items based on the related items having attributes related to the at least one attribute of the primary item.

18. The method of claim 10, further comprising:
receiving a navigational input; and
spatially shifting the related items on the visual display based on the navigational input.

19. A machine-readable storage medium having no transitory signals and storing instructions which, when executed by the at least one processor of a machine, cause the machine to perform operations comprising:
cause presentation of a visual display on a device, the causing comprising:
positioning a primary item in a predetermined location on the visual display;
determining, by a hardware processor, navigation direction constraints, the navigation direction constraints providing guidance as to where related items that are related to the primary item, based on at least one attribute of the primary item and attributes of the related items, are to be located in the visual display; and
positioning the related items in proximity to the predetermined location of the primary item based on the determined navigation direction constraints.

20. The machine-readable storage medium of claim 19, wherein the operations further comprise causing display of a navigation control on the visual display, the navigation control indicating available directions for multi-direction visual browsing.

* * * * *